AGITATION SENSITIVE ALARM CIRCUIT

Filed Nov. 13, 1967

Inventors:
JAMES R. HALL &
PETER B. KORDA
By Edward J. Norton
Attorney

United States Patent Office 3,559,203
Patented Jan. 26, 1971

3,559,203
AGITATION SENSITIVE ALARM CIRCUIT
James R. Hall, Canoga Park, and Peter B. Korda, Los Angeles, Calif., assignors to RCA Corporation of America, a corporation of Delaware
Filed Nov. 13, 1967, Ser. No. 682,121
Int. Cl. G08b 13/12
U.S. Cl. 340—261                                     6 Claims

ABSTRACT OF THE DISCLOSURE

An agitation sensitive alarm circuit including sensing means formed of electrically conductive, loosely intercoupled links, characterized by stable and unstable impedance states; the slightest agitation being sufficient to transfer said sensing means from its stable state to its unstable state.

---

This invention relates to switch devices in general and, more particularly, to a switch device for use in an intruder detection system.

There are many diverse types of systems in existence today, the function of which is to detect the presence of a predetermined condition and activate an alarm in response thereto. These systems generally include a sensing element coupled in some manner to an alarm device, the operation of the latter being contingent upon the condition of the former. The sensing device may operate in any of a number of ways. For example, it may be temperature sensitive as in the case of a thermostat, or light sensitive as in the case of a photocell. Systems which are used to detect the presence of an intruder, such as burglar or theft alarm systems, often utilize an electromechanical type sensing element to activate the alarm. These elements generally operate on a make-break concept wherein physical contact by an intruder with the element causes it to either open or close an electrical circuit, whichever the desired case may be. Though several such electromechanical systems are well known in the art, too often they incorporate many disadvantages, e.g., the sensing elements may be relatively large in size and not sufficiently sensitive to physical contact, they may be difficult to position or set up, or they may be relatively easy to detect and circumvent.

SUMMARY OF THE INVENTION

This invention relates to a novel switch element, sensitive to agitation, which may be incorporated into a detection system for indicating the presence of an intruder, or other like systems.

Basically, the switch element consists of a plurality of electrically conductive links which are intercoupled to form a loose chain. The resulting chain-like assembly, when randomly placed into a quiescent state, exhibits a relatively high through impedance. Should the switch be agitated, e.g., as a result of coming in contact with a foreign substance, the through impedance of the assembly will decrease to a relatively low value.

Accordingly, it is an object of the present invention to provide an electromechanical switch which is sensitive to agitation and insensitive to position.

Another object is to provide such a switch which is relatively small in size, mass producible, and inexpensive.

DESCRIPTION OF THE FIGURES

The foregoing objects, along with additional objects and applications, will become more readily evident to those skilled in the art after reading the specification which follows in conjunction with the accompanying drawings wherein:

FIG. 1 represents the basic configuration of the disclosed invention. As shown it consists of a plurality of electrically conductive links 10 which are intercoupled to form a loose chain 12. Experimentation has shown that the underlying theory which describes the operation of the switch is equally applicable regardless of the physical size of the links 10 used. As a practical matter, however, it has been found that relatively small links 10, such as are incorporated in neck-chains, are best suited for constructing a sensing device for use in an intruder detection alarm system, and further discussion within the application will be so oriented.

Figure 1:
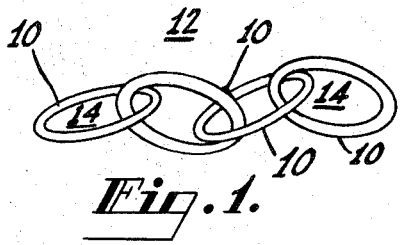
FIGS. 1 through 4 represent alternative configurations which the agitation switch may assume.

As previously described, a chain-like switch 12, as shown in FIG. 1, exhibits a variable impedance as measured across its length, the range of which has limits effectively corresponding to an open circuit at one extreme and a closed circuit at the other. The significant characteristic which such a structure displays, and which makes it particularly advantageous for use in an intrusion detection system, is that it exhibits a high through impedance when in a state of quiescence without its having been particularly positioned to do so. That is, if the switch 12 is arbitrarily permitted to come to a random state of rest, and the impedance across its outer links 14 measured, it will be found to be relatively high. In the case of a switch composed of four links 10 the impedance has been found to be in excess of 20 megohms when the switch 12 is randomly placed at rest. This characteristic can be explained as a result of the relatively high probability against each of the links 10 making perfect electrical contact with those links disposed adjacent to it when randomly placed into a state of quiescence. The cascaded effect to the poor electrical contact between individual links 10 results in the relatively high impedance of the overall assembly.

When the asembly is momentarily disturbed from its position of rest, the individual links 10 are brought into effective electrical contact with each other and the overall impedance of the assembly is substantially reduced. Measurements taken during periods of agitation revealed that the impedance of the assembly dropped to values of less than 10 ohms for periods ranging from thirty microseconds to four milliseconds.

Figure 5:
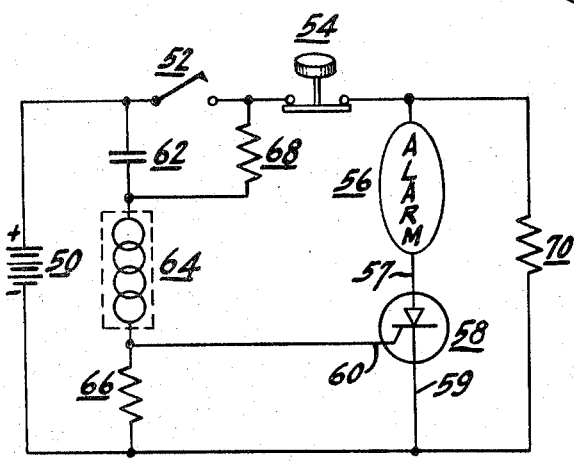
FIG. 5 represents a circuit diagram of an alarm system showing how the agitation switch may be incorporated into such a system.

A switch exhibiting the above described characteristics offers significant benefits when incorporated into an electrical circuit. In the case of an alarm system the switch may normally operate to effectively open a circuit when it is in a state of rest. Should the switch be disturbed by an intruder it will effectively operate as a closed circuit to permit the completion of the alarm circuit and result in the activation of the alarm device. FIG. 5 is a circuit diagram of an alarm system into which such a switch may be readily incorporated.

In the alarm system represented by FIG. 5 the positive terminal of a battery 50 is connected to one side of a mechanical switch 52 having an open position and a closed position. The second side of the mechanical switch 52 is connected to one side of a normally closed reset switch 54. The second side of the reset switch is connected to one side of an alarm device 56. The second side of the alarm device 56 is connected to the anode 57 of a silicon controlled rectifier (SCR) 58. The cathode 59 of the SCR 58 is connected to the negative terminal of battery 50 to complete a circuit. A capacitor 62 is connected in series with an agitation switch 64 and a resistor 66, in the order named; the capacitive side of the series combination connected to the positive terminal of the battery 50, and the resistive side of the series combination connected to the negative terminal; the agitation switch 64 being of the type previously described. A resistor 68 is connected on one side to the junction formed by the mechanical switch 52 and the reset switch 54; and on its other side to the junction formed by the capacitor 62 and the agitation switch 64. The gate electrode 60 of the SCR 58 is connected to the junction formed by the agitation switch 64 and the resistor 66. A resistor 70 is connected on one side to the junction formed by the reset switch 54 and the alarm device 56; and on the other side to the cathode 59 of SCR 58.

Turning now to a brief description of the operation of the circuit depicted in FIG. 5, when switch 52 is in its off position, capacitor 62 is charged through resistor 68, the normally closed reset switch 54, and resistor 70; the agitation switch 64 normally exhibiting a relatively high through impedance, corresponding to an open circuit, when in a state of rest. To operate the system, switch 52 is closed thereby causing capacitor 62 to discharge through the switch 52 and resistor 68. Thereafter, should switch 64 be agitated even momentarily, its impedance will decrease to effectively present a closed circuit, which will result in capacitor 62 charging through resistor 66 and the gate electrode 60 of SCR 58 via the agitation switch 64. This will operate to apply a triggering signal to the gate 60 of the SCR 58 and, since the SCR 58 is already forward biased by the battery 50, will cause the SCR to be switched into a conducting state whereby the alarm device 56 will be connected to the battery 50 and activated. If the alarm 56 is continuous in operation it may be discontinued by utilizing the reset switch 54, the opening of which will cause the SCR to discontinue operation pending the application of a subsequent triggering signal.

Figure 2:
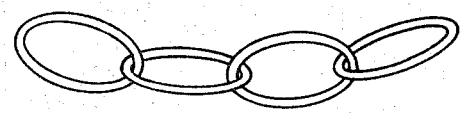

While the above described embodiment utilizes the characteristics of the agitation switch to activate an alarm when the switch is closed, it will be readily evident that applications of the switch need not be so limited. For example, FIG. 2 shows an agitation switch suspended by its terminal links, such that gravitational forces tend to cause the switch to exhibit a relatively low through impedance, i.e., the links are normally brought into good electrical contact effectively resulting in a closed circuit. In such a case the through impedance of the switch is normally low and will, upon agitation, effectively operate to result in an opened circuit. Various circuits may be developed to utilize the foregoing characteristics of the described agitation switch. For example, circuits may be designed having delayed firing characteristics wherein the alarm device will not be activated upon the initial closing of the agitation switch but only upon subsequent closings.

Figure 3:
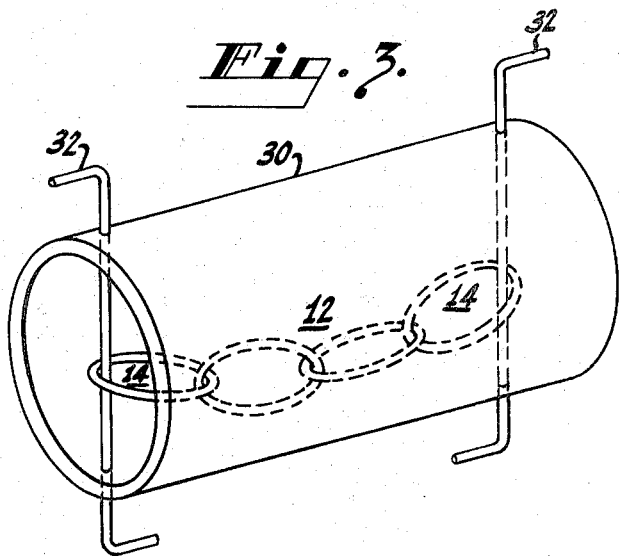
Figure 4:
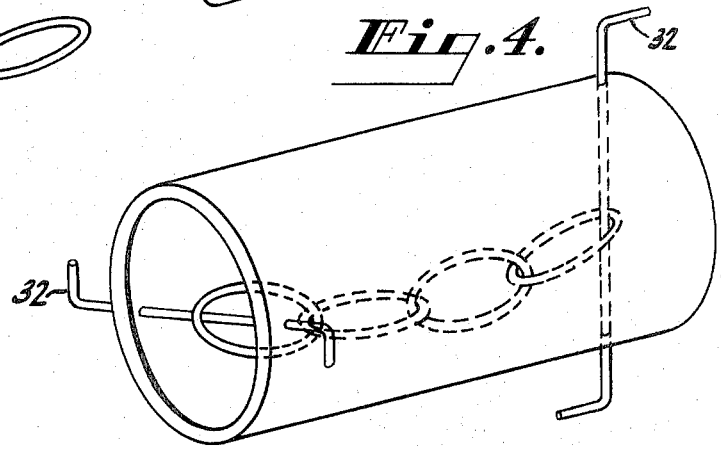

FIG. 3 depicts an agitation switch as previously described which has been enclosed within a sleeve-like housing 30. The enclosure 30 serves to protect the switch 12 from external forces which might tend to impair its operation. Furthermore, the sleeve 30 may in a proper case prevent gravitational closures of the switch should the same not be desired. The housing may be made of a plastic or other non-conductive material and may be opened at its extremities or totally enclosed. External connections are made to the switch via connecting terminals 32 which are secured through the housing 30 and extend therefrom. Internally, the connecting terminals pass through the end links 14 of the switch 12 and are disposed to lossely secure them in position without affecting the physical and/or electrical characteristics of the switch previously described. The switch shown in FIG. 4 is similar in structure to that of FIG. 3 except that in the case of the latter the connecting terminals 32 are arranged in non-parallel relationship with respect to each other. This has been found to effectuate a greater sensitivity of switch operation and to make the characteristics of the switch even more independent of its physical orientation.

We claim:
1. An intrusion alarm system comprising:
 (a) an agitation sensitive switch formed of a plurality of intercoupled links, said links exhibiting a relatively high through impedance during periods of quiescence and a relatively low through impedance during periods of agitation;
 (b) circuit means including an alarm device, said alarm device conditioned to be activated when said circuit is effectively completed; and
 (c) means for connecting said agitation sensitive switch to said circuit means;
  the transition of said switch from its high impedance state to its low impedance state, in response to agitation thereof by an intruder, operating to effectively complete said circuit thereby resulting in the activation of said alarm device.

2. An alarm system comprising:
 (a) an agitation sensitive switch formed of a plurality of intercoupled electrically conductive links, said links exhibiting a relatively low through impedance when suspended by terminals in free space, and a relatively high through impedance when disturbed from said state of suspension;
 (b) circuit means including an alarm device, said alarm device conditioned to be activated when said circuit is effectively completed; and
 (c) means for connecting said agitation sensitive switch to said circuit means,
  the transition of said switch from its low impedance state to its high impedance state, in response to a disturbance from its state of suspension in free space, operating to effectively complete said circuit thereby resulting in the activation of said alarm device.

3. In combination;
 circuit means including an alarm device,
 a chain of loosely intercoupled conductive links characterized by a stable impedance state and an unstable impedance state, said stable state occurring when said chain is quiescent, said unstable state occurring only when said chain is being agitated,
 means for connecting said chain and said circuit means,
 said alarm being actuated by the momentary transition of said chain from said stable to said unstable state.

4. The invention as defined in claim 3 wherein said chain exhibits a relatively high through impedance when in said stable state and a relatively low through impedance when in said unstable state.

5. The invention as defined in claim 4;
 said stable state being insensitive to the quiescent position of said links,
 said chain becoming unstable only during periods of agitation and automatically returning to said stable impedance state upon the conclusion thereof.

6. The invention as defined in claim 3 wherein said chain exhibits a relatively low through impedance when in said stable state, said stable state corresponding to the suspension of said chain in free space by at least one link thereof,
 said chain exhibiting a relatively high through impedance when in said unstable state, said unstable state occurring in response to the momentary agitation of said suspended chain.

References Cited
UNITED STATES PATENTS

| | | | |
|---|---|---|---|
| 2,712,601 | 7/1955 | Reinwald | 340—261X |
| 3,170,320 | 2/1965 | Talmo | 338—43X |
| 3,204,232 | 8/1965 | Meyer | 340—261 |
| 3,254,334 | 5/1966 | Mitchell | 340—276 |
| 3,284,787 | 11/1966 | Voigt et al. | 340—276X |

DONALD J. YUSKO, Primary Examinem

P. PALAN, Assistant Examiner

U.S. Cl. X.R.

200—61.45; 338—43, 208; 340—276